United States Patent [19]

Rusu

[11] Patent Number: 4,711,615
[45] Date of Patent: Dec. 8, 1987

[54] TURBOPROP OVERSPEED PROTECTION SYSTEM

[75] Inventor: Radu Rusu, Bridgeport, Conn.

[73] Assignee: Textron/Auca Corp., Providence, R.I.

[21] Appl. No.: 864,602

[22] Filed: May 19, 1986

[51] Int. Cl.$^4$ ............................................. B64C 11/40
[52] U.S. Cl. ...................................... 416/46; 416/154
[58] Field of Search ..................... 416/46, 61, 153, 154

[56] References Cited

U.S. PATENT DOCUMENTS

| | | | |
|---|---|---|---|
| 1,857,392 | 5/1932 | Nixon | 416/153 X |
| 2,355,039 | 8/1944 | Eves | 416/153 X |
| 2,551,649 | 5/1951 | Taylor | 416/61 X |
| 2,703,148 | 3/1955 | Pearl | 416/154 |
| 2,934,154 | 4/1960 | Chilman | 416/154 X |
| 2,994,385 | 8/1961 | Jackson | 416/61 X |
| 3,017,932 | 1/1962 | Chilman | 416/61 X |
| 3,067,825 | 12/1962 | Chilman et al. | 416/154 |
| 3,175,620 | 3/1965 | Newton | 416/154 |
| 3,219,121 | 11/1965 | Barden | 416/154 |
| 3,746,466 | 7/1973 | Dallach et al. | 416/153 |
| 4,533,296 | 8/1985 | Duchesneau et al. | 416/46 |

FOREIGN PATENT DOCUMENTS

| | | | |
|---|---|---|---|
| 3105484 | 9/1982 | Fed. Rep. of Germany | 416/154 |
| 887123 | 1/1962 | United Kingdom | 416/154 |
| 962905 | 7/1964 | United Kingdom | 416/46 |

*Primary Examiner*—Everette A. Powell, Jr.
*Attorney, Agent, or Firm*—Perman & Green

[57] ABSTRACT

An overspeed protection system is provided for a turboprop engine. The engine includes a governor pump and a constant speed governor both of which are driven by the turbine through a gear reduction assembly. The constant speed governor is in communication with the pitch adjustment means of the propeller and is operative to effect adjustments in the propeller pitch. The system further includes a pressure sensitive switch that is operative to sense a decrease in pressure of the fluid flow produced by the governor pump and thereby sensing a system failure. A solenoid is provided and is operative to prevent pitch adjustments after a system failure sensed by the pressure sensitive switch.

15 Claims, 3 Drawing Figures

TURBOPROP OVERSPEED PROTECTION SYSTEM

BACKGROUND OF THE INVENTION

Turboprop aircraft engines include a propeller and a gas turbine engine. At least one stage of the gas turbine engine acts through a gear reduction system to drive the propeller.

The thrust produced by a turboprop engine is a function of several parameters, including, the rotational speed of the propeller and the angular alignment, or pitch, of the generally flat propeller blades relative to the direction of movement of the aircraft. For example, if the plane of each generally flat propeller blade is aligned nearly parallel to the direction of movement of the aircraft, the propeller will produce little thrust and will create little drag on the aircraft. This blade alignment is referred to as a neutral pitch or a feather pitch. If the plane of each propeller blade is more nearly perpendicular to the direction of movement of the aircraft, the propeller also will produce little thrust but will create a greater amount of drag on the aircraft. This latter position is defined as a fine or flat pitch. The blade pitch will be between these two extremes during most flight conditions. The adjustability of the pitch enables a careful balancing of the forces exerted on the propeller blades by the engine with the forces exerted on the propeller blades by the air through which the turboprop engine is moving.

Most turboprop engines include a complex hydraulic system that senses speed and power lever position, and adjusts the pitch of the propeller blades accordingly to prevent either an underspeed or an overspeed condition. More particularly, a flow of hydraulic fluid, such as engine oil, is created by a governor pump, and is urged through a constant speed governor and toward the propeller pitch adjustment mechanism. The specific operation of the constant speed governor will be explained in greater detail below. However, it should be noted that the governor pump, the constant speed governor and in some applications the overspeed governor are operated through a gear reduction mechanism that is driven by the power turbine of the turboprop engine. The pressure of hydraulic fluid to the propeller pitch adjustment mechanism varies in accordance with the rotational speed of the engine and the internal controls of the constant speed governor. Generally, an underspeed condition will change the hydraulic pressure between the constant speed governor and the propeller pitch adjustment mechanism and will cause the propeller blades to move toward a fine pitch. Conversely, an overspeed condition will cause an opposite change in the hydraulic pressure and will urge the propeller blades toward a coarser pitch.

The hydraulic system which determines the pitch of the propeller blades also includes a lock pitch solenoid which is selectively operable to lock the propeller blades into the then existing pitch. More particularly, the lock pitch solenoid may include a mechanical member which interrupts the flow of hydraulic fluid between the governor and the propeller adjustment mechanism. This interruption will prevent the hydraulic pressure from either increasing or decreasing. Consequently, the propellers will be locked at a constant pitch until some change in the system is put into effect. The lock pitch solenoid typically is activated by a movement of the power lever that would be made during an approach for a landing. Under these circumstances, the lock pitch solenoid is effective in preventing the propellers from moving to a very fine pitch or to a reverse pitch.

The prior art propeller pitch adjustment mechanism also is provided with a means for producing a feather or neutral pitch as a fail-safe in response to a sensed failure in the turbine or the gear reduction mechanism.

The prior art turboprop engines perform well under most conditions. Recently, however, certain engine failures have been observed that were not properly addressed by the existing fail-safe systems. After an investigation of these failures, it was determined that the existing fail-safe controls were too slow in addressing a failure in the governor pump, in the constant speed governor or the complex gear reduction mechanism which drives the governor pump, the constant speed governor and in some applications the overspeed governor. More particularly, it was found that during the short period of time following the above described failure, a residual pressure will continue to develop in the hydraulic system which operates the propeller pitch adjustment mechanism, as a result of the gear coastdown. This residual pressure in a very short time is capable of moving the propeller blades toward fine pitch. The failure causes the internal controls of the governor to move into positions which reflect an underspeed condition. The residual pressure combined with the sensed underspeed condition could cause the propeller pitch adjustment mechanism to move the propeller blades rapidly into a very fine pitch or flat pitch condition, even though the aircraft operating conditions did not warrant such an adjustment. Thus, an overspeed condition would be created. Obviously, this incorrect adjustment to a fine pitch would imbalance the forces exerted on the propeller blades significantly because of the drag inherent with the fine pitch alignment. In some situations the propeller would survive this condition long enough for the prior art fail-safe mechanism to sense the system failure and move the propeller blades into the feather or neutral pitch condition. However, in other instances, the imbalance created by the sudden and unjustified movement of the propeller blades into a very fine or flat pitch would cause catastrophic damage to the turboprop engine, as a consequence of the overstress encountered by the engine-propeller rotating parts.

In view of the above, it is an object of the subject invention to provide an apparatus that will properly control the propeller pitch adjustment mechanism in response to a failure in the governor or the gears driving the governor.

It is another object of the subject invention to provide an apparatus for rapidly sensing a failure in the governor or the apparatus which drives the governor, and which then will appropriately control the propeller pitch adjustment mechanism.

It is an additional object of the subject invention to provide an apparatus for preventing the propeller from moving into a fine pitch in response to a mechanical failure in the turboprop engine.

It is a further object of the subject invention to provide a system that prevents unwarranted overspeed pitch adjustments and that can be readily incorporated into existing turboprop engines.

SUMMARY OF THE INVENTION

The overspeed protection system of the subject invention is intended for application with a turboprop engine having a hydraulically controlled propeller pitch adjustment mechanism. More particularly, the subject invention is intended for incorporation into an engine wherein the hydraulic system includes a hydraulically operated constant speed governor, a governor pump and an overspeed governor which are driven by the turbine through an appropriate gear reduction mechanism.

The apparatus of the subject invention comprises a pressure stabilizing means such as a lock pitch solenoid in communication with the hydraulic system of the propeller pitch adjustment mechanism at a location intermediate the constant speed governor and the propeller. As noted above, lock pitch solenoids of this type are incorporated into certain turboprop engines and are operative to effectively block the flow of fluid between the constant speed governor and the propeller pitch adjustment mechanism, thereby preventing any variations in hydraulic pressure that would otherwise change the pitch of the propeller blades.

The apparatus of the subject invention further includes a pressure sensing means, such as a pressure sensitive switch means in communication with the hydraulic system and also in communication with the lock pitch solenoid. The pressure sensitive switch preferably is operative to sense variations in pressure in the hydraulic system and to trigger the lock pitch solenoid in response to a sensed variation in pressure. In one embodiment, the pressure sensitive switch is in communication with the hydraulic system at a location intermediate the governor pump and the constant speed governor. As noted above, this portion of the hydraulic system provides a constant fluid pressure but a variable flow rate when the system is operating properly. Consequently, any decrease in the hydraulic pressure will identify a system failure.

The apparatus of the subject invention can be operative to be overridden by other fail-safe measures of the turboprop engine. Thus, for example, when the failure is sensed by other parts of the system, the fail-safe measures will move the propeller blades into the feather or neutral pitch, as had been done previously. It will be appreciated, therefore, that a principal advantage of the subject invention is the avoidance of the above described unjustified adjustment into fine or flat pitch that otherwise could occur during the period immediately following a system failure.

The subject invention may also include test circuitry which extends from the pressure switch to the cockpit. This circuitry will enable the pilot to test the operability of the apparatus while the aircraft is on the ground.

The subject invention can readily be incorporated into any turboprop engine that has a governor pump, a constant speed governor and a lock pitch solenoid. Furthermore, the subject invention may include a lock pitch solenoid that is incorporated into an engine that is not provided with a lock pitch solenoid.

DETAILED DESCRIPTION OF THE PREFERRED EMBODIMENTS

Figure 1:
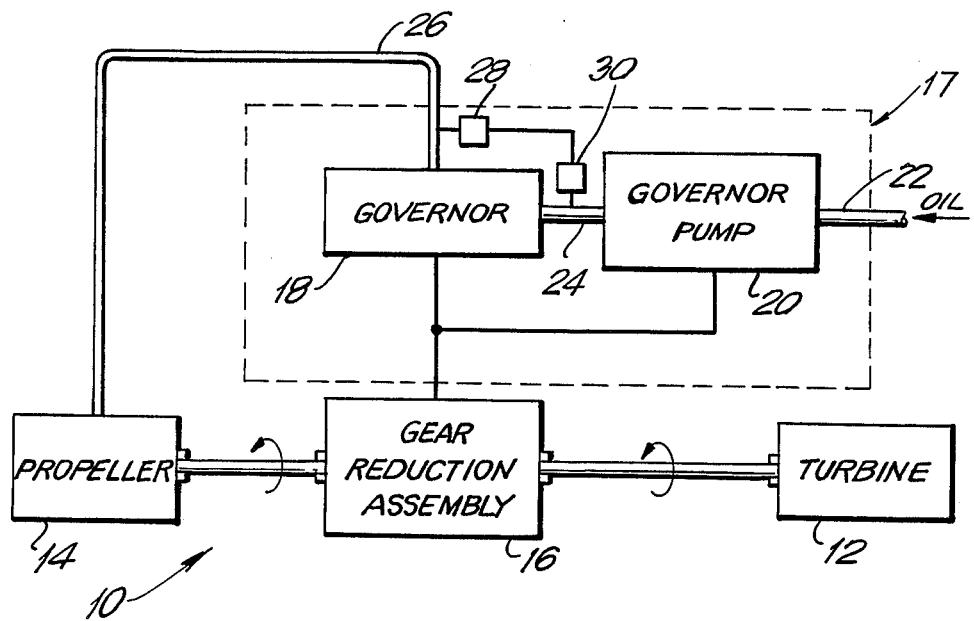
FIG. 1 is a schematic diagram of a turboprop engine incorporating the apparatus of the subject invention.

A turboprop engine which incorporates the overspeed protection system of subject invention is displayed schematically in FIG. 1 and is identified generally by the numeral 10. The turboprop engine 10 includes a turbine 12 which is operative to produce power by burning fuel in the presence of compressed air and passing the resulting combustion gasses through alternating arrays of rotating and stationary blades. A portion of the power produced by the turbine 12 is transmitted to the propeller, or prop indicated by the numeral 14 in FIG. 1. The propeller 14 includes a rotating array of generally radially extending blades which produce a portion of the thrust of the turboprop engine 10. As will be explained in greater detail below, the blades of the propeller 14 are rotatable about their respective radially extending axes to achieve varying pitches with respect to the direction of movement of the turboprop engine 10.

The turboprop engine 10 further includes a constant speed governor 18 and a governor pump 20 which are driven by the turbine 12 through the gear reduction assembly 16. The governor pump 20 is in communication with the engine oil pump through line 22, and is operative to pump oil through line 24 and to the constant speed governor 18. More particularly, the governor pump 20 is operative to pump oil at a substantially constant pressure, but at a fluid flow rate that varies in proportion to the speed of turbine 12. The constant speed governor 18 is operative to direct the oil through servo line 26 to the propeller 14 at varying fluid pressures. The pitch of the blades on propeller 14 will vary in accordance with the flow characteristics of oil through servo line 26 from the governor 18. More particularly pressures in servo line 26 urge the blades of propeller 14 toward a finer pitch when the speed of the engine decreases. On the other hand, pressures in servo line 26 urge the blades of propeller 14 toward a coarser pitch when the speed of the engine increases.

The turboprop engine 10 further includes a lock pitch solenoid 28 which is in communication with the servo line 26 and is operative to block the flow of fluid through servo line 26, thereby preventing any significant variations in pressure therein. Prior art turboprop engines that include a lock pitch solenoid are operative to trigger the solenoid when the pilot pulls back on the power lever as part of a landing approach.

The turboprop engine 10 of the subject invention further includes a pressure sensing switch means 30 which is in communication with the lock pitch solenoid 28 and with the oil line 24 between the governor pump 20 and the constant speed governor 18. The pressure sensing switch 30 is operative to sense a drop in pressure in line 24 below the normally constant level. When such a pressure drop is sensed by the switch means 30, a signal will be sent to the lock pitch solenoid 28 such that the oil pressure in servo line 26 will be held at a constant level, thus preventing the blades of propeller 14 from advancing into a fine pitch.

Figure 2:
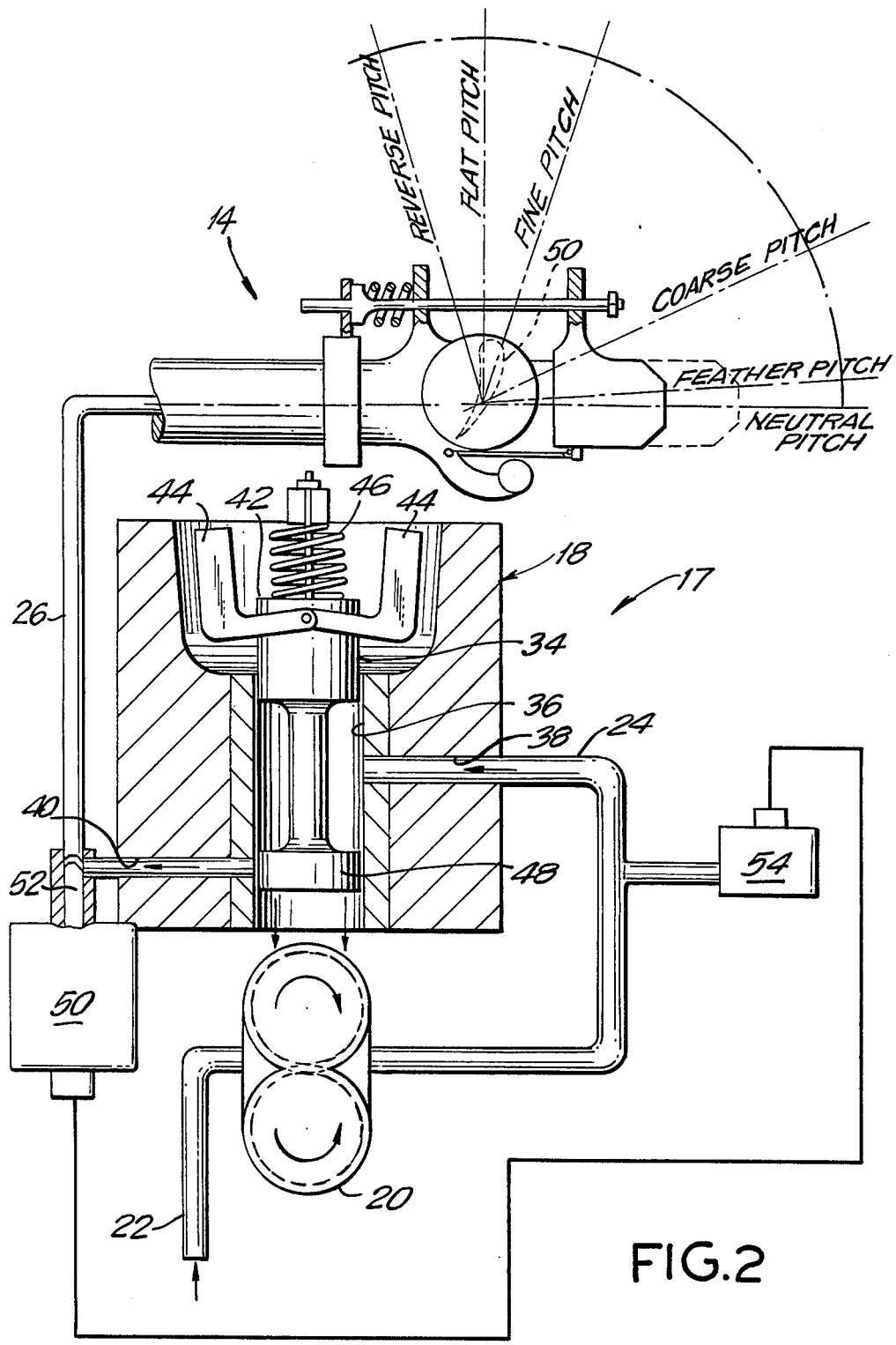
FIG. 2 is a cross-sectional diagram showing one embodiment of the subject invention.

The overspeed protection system of the subject invention is shown in greater detail in FIG. 2. More particularly the overspeed protection system 17 includes a constant speed governor 18 and a governor pump 20. The governor pump 20 is in communication with the engine oil supply through line 22 and is operative to pump oil at constant pressure to the constant speed governor 18 through line 24. As explained above, the constant speed governor 18 in turn is in communication with the propeller 14 through servo line 26.

Both the constant speed governor 18 and the governor pump 20 are driven by the turbine of the turboprop engine through a gear reduction assembly, all of which were illustrated sechematically in FIG. 1, but are not shown in FIG. 2. The constant speed governor 18 includes a cylinder 36 in which a piston 34 is mounted for both slidable and rotatable movement. The governor 18 further includes a first aperture 38 extending from oil line 24 to the cylinder 36, and a second aperture 40 extending from the cylinder 36 to the servo line 26. Piston 34 includes a first end 42 to which flyweights 44, are pivotally mounted. Spring 46 is biased against the first end 42 to urge the piston 34 downwardly. The piston 34 further includes an opposed end 48 which is dimensioned to at least partly block the aperture 40 leading to servo line 26.

The interconnection of the gear reduction assembly (not shown) and the piston 34 of governor 18 is such that the piston 34 rotates about its central axis at a speed which is proportional to the rotational speed of the turbine. Increases in the rotational speed of the piston 34 will increase centrifugal forces and urge the flyweights 44 outwardly and against the walls of the cylinder 36. As a result, the piston 34 will be urged upwardly and against the forces exerted by spring 46. Conversely, a slower rotational speed of piston 34 will decrease the centrifugal forces on flyweights 44, thus enabling spring 46 to urge the piston 34 downwardly. When the piston 34 is in a generally upward position, as shown in FIG. 2, the flow of oil through governor 18 will be substantially impeded. This will affect the pressure in servo line 26 and cause each blade 50 of propeller 14 to move toward a coarser pitch. Conversely, a slowing of the rotational speed of piston 34 will cause the piston to move downwardly, such that the end 48 thereof blocks less of aperture 40. The resulting change in servo pressure in servo line 26 will cause blades 50 of propeller 14 to move toward a finer pitch alignment.

A lock pitch solenoid 50 is provided and includes a plunger 52 which is movable into communication with the servo line 26. More particularly, the lock pitch solenoid 50 can be activated such that the plunger 52 thereof blocks the servo line 26 to prevent any variations in the oil pressure therein. As noted above, the lock pitch solenoid 50 typically is activated in response to movements of the power lever by the pilot on a landing approach. These movements prevent variations in oil servo-pressure that would achieve a flat pitch or a reverse pitch.

As noted above, the governor 18 and governor pump 20, are driven by a complex gear reduction assembly, which in turn is driven by the turbine. A failure at any point in the gear reduction assembly could prevent the piston 34 of governor 18 from rotating and could prevent the governor pump 20 from producing the required oil pressure levels. Most turboprop engines include a fail-safe means which is operative to move the propeller into a feather or neutral pitch in response to a failure in the drive mechanism. However, during the initial period following such a failure a residual oil pressure will be present in the servo line 26. More particularly, as the piston 34 stops rotating in response to the gear failure, the centrifugal forces exerted on the flyweights 44 will decrease, and the spring 46 will cause the piston 34 to be urged downwardly. Thus, an increasing proportion of aperture 40 will be exposed. Consequently, even though the oil pressure in line 24 is gradually decreasing, the reduction of pressure and flow in servo line 26 will be slow. The pitch adjustment mechanism for the propeller will interpret this initial gradual pressure change as being an underspeed operating condition. Consequently, the propeller pitch adjustment mechanism will cause the propeller blades to move into a fine or flat pitch alignment. This incorrectly sensed underspeed condition will in fact cause the propeller blades to move into a pitch alignment that will create an overspeed condition. Thus, the propeller blades will approach a fine or flat pitch alignment that is not in equilibrium with the associated rotational speed of the engine-propeller system and the forward speed of the aircraft. The resulting forces exerted on high speed rotational parts could exceed the stress limits on those parts and cause severe structural damage to the engine-propeller, such as the turbine disc disintegration followed by other undesirable consequences. Eventually, the failure in the gear reduction assembly and the resulting pressure variations will be sensed as a failure by the propeller pitch adjustment mechanism, and the propeller will advance into its fail-safe feather or neutral pitch alignment. Unfortunately, however, the damage may already have been done in the initial seconds following the gear failure.

To overcome the potentially disasterous problems associated with a gear failure, the subject invention includes a pressure sensitive switch 54 in communication with the oil line 24 between the governor 18 and the governor pump 20. The pressure sensitive switch 54 is operative to sense a drop in pressure in line 24. As noted above, the governor pump 20 normally produces a constant oil pressure in line 24. Therefore, any decrease in oil pressure in line 24 sensed by the pressure sensitive switch 54 is likely to be an indication of a system failure.

The pressure sensitive switch 54 also is in communication with the lock pitch solenoid 50. This communication is operative to trigger the lock pitch solenoid 50 when a decrease in pressure is sensed. This movement of the plunger 52 will block the servo line 26, thereby locking the propeller blades into the then existing pitch and preventing any unjustified advancement into a fine or flat pitch. Eventually, the total failure of the system will be sensed by the fail-safe apparatus of the propeller pitch adjustment mechanism and the propeller blades will be moved into the feather or neutral pitch.

Figure 3:
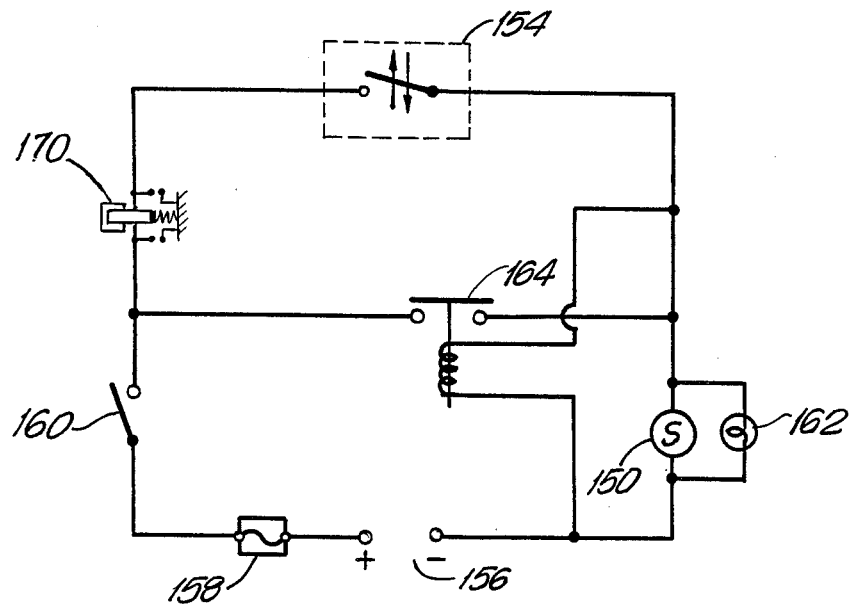
FIG. 3 shows the electronic circuitry for the apparatus of the subject invention.

The electric circuitry for the above described system is illustrated in FIG. 3, and is indicated generally by the numeral 100. The electrical system 100 includes a lock pitch solenoid 150 similar to the lock pitch solenoid 50 described above, and a pressure sensitive switch 154 similar to the switch 54 described with reference to FIG. 2. The pressure sensitive switch 154 is in electrical communication with the lock pitch solenoid 150, but is normally in an open position such that no current flows therethrough.

The electrical system 100 further includes a power source 156, an automatic circuit breaker 158 and an arming switch 160 which puts the entire electrical system into operation. The arming switch 160 could either be manually operable or automatic, and in either event is placed into the closed position immediately after the start of the engine.

The electrical system further includes a warning means 162 in communication with the lock pitch solenoid and preferably located in the cockpit. The warning means 162 is operable to provide a visual or audible signal in the cockpit when the lock pitch solenoid has been activated. Thus, the pilot immediately will be advised of operating conditions that lock the pitch of the propeller blades, including an operating failure that results in a drop of pressure in the governor pump.

The system further includes a time delay apparatus 164 which is in communication with the power source 156 and the pressure sensitive switch 154, and which is operative to complete the circuit between the power source and the lock pitch solenoid 150. The time delay relay 164 supplies D.C. power to the lock pitch solenoid 150 to insure its operation for a period of time that reflects the governor pump pressure decay and the coast down operating characteristics of the governor. More particularly, the time delay relay 164 will keep the lock pitch solenoid 150 activated for a length of time sufficient to ensure no change in servo pressure that would move the propeller blades toward a fine or reverse pitch. After the selected period of time has elapsed, power will be restored to the lock pitch solenoid. At that time, the servo pressure will have stabilized and the normal propeller fall-safe mechanisms will advance the blades toward a feather or neutral pitch, thereby reducing drag and preventing structural problems. On the other hand, if the initial operational problem has been corrected, the pressure switch 154 will sense a governor pump pressure above the triggering level of the pressure switch 154, thereby opening the pressure switch 154, releasing the lock pitch solenoid 150 and allowing the propeller blades to return to their normal operation in proportion to the servo pressure.

It is possible that during the flight, with the engine-propeller system functioning properly, the pilot (or the flight engineer) will execute a snap-deceleration from higher power level to flight-idle, and the governor pump pressure might decay for a certain amount of time under the pressure switch set-point and activate the lock pitch solenoid. In such circumstances the time delay relay will supply power to the lock pitch solenoid for a predetermined length of time. For that period of time the propeller is functioning similar to a constant pitch propeller. Finally the circuitry may to a constant pitch propeller. Finally the circuitry may include test switch 170 for testing the operation of the apparatus. The test switch 170 would be disposed for easy activation by the pilot.

In summary, a system is provided for incorporation into a turboprop engine to prevent movement of the propeller blades into an overspeed pitch alignment in response to a failure in the propeller governor gear reduction assembly. The subject system includes a pressure sensing switch means in communication with a fluid line that leads to the constant speed governor, and which under normal engine operating conditions will maintain a substantially constant pressure. However, this line will undergo an immediate measurable pressure drop upon a failure in the gear reduction assembly. This pressure drop will be sensed by the pressure sensitive switch. The pressure sensitive switch is further in communication with the lock pitch solenoid, and will send a signal thereto upon a sensed decrease in pressure. The lock pitch solenoid, in turn, will prevent any further advance of the propeller blades toward a fine pitch. The system may further include a time delay relay that is operative to keep the lock pitch solenoid activated for a time period consistent with the pressure decay characteristics of the governor, covering any unexpected governor pump pressure increase above pressure switch set point. Thus, the lock pitch solenoid will be deactivated and the propeller pitch will be determined by the actual servo pressure and other sensed operational characteristics.

While the invention has been described with respect to certain preferred embodiments, it is apparent that various modifications can be made thereto without departing from the spirit of the invention as defined by the appended claims.

What is claimed is:

1. An overspeed protection system for a turboprop engine comprising a turbine, an array of propeller blades rotatably driven by gear reduction drive means operatively engaged with said turbine, a fluid actuated pitch adjustment means mounted to said array for adjusting the pitch of the propeller blades, and a source of fluid in communication with said pitch adjustment means, said overspeed protection system comprising:

a governor pump in communication with the source of fluid for producing a constant pressure flow of the fluid from said source;

a constant speed governor in communication with and intermediate said governor pump and the pitch adjustment means for directing flow of the fluid to the pitch adjustment means at a pressure proportional to the speed of the turbine;

pressure stabilizing means disposed intermediate said constant speed governor and said pitch adjustment means operable for preventing variations in pressure between said pressure stabilizing means and said pitch adjustment means; and a pressure sensing means disposed intermediate said governor pump and said constant speed governor for sensing a reduction in the pressure of the fluid produced by said governor pump by reason of failure of the gear reduction drive means, said pressure sensing means being operatively connected to said pressure stabilizing means such that a pressure change sensed by said pressure sensing means activates said pressure stabilizing means to prevent variations in pressure intermediate said pressure stabilizing means and said pitch adjustment means.

2. An overspeed protection system as in claim 1 wherein said pressure stabilizing means comprises a plunger operative to interrupt the flow of fluid intermediate said constant speed governor and said pitch adjustment means.

3. An overspeed protection system as in claim 2 wherein said pressure stabilizing means comprises a lock pitch solenoid.

4. An overspeed protection system as in claim 1 wherein the pressure sensing means comprises an electrically operable pressure sensitive switch intermediate the governor pump and the constant speed governor and being operative to sense a decrease in the pressure of fluid produced by said governor pump.

5. An overspeed protection system as in claim 1 wherein said pressure stabilizing means comprises a solenoid switch including plunger means for blocking the flow of fluid intermediate said constant speed governor and said pitch adjustment means, and wherein said pressure sensing means comprises a pressure sensitive switch in communication with the flow of fluid produced by said governor pump.

6. An overspeed protection system as in claim 5 wherein said lock pitch solenoid and said pressure sensitive switch are in electrical communication with one another.

7. An overspeed protection system as in claim 6 further including a source of electrical power in communication with said pressure sensitive switch and said lock pitch solenoid.

8. An overspeed protection system as in claim 1 further including means for testing the operation of said pressure stabilizing means.

9. An overspeed protection system as in claim 1 further comprising indicator means in communication with said pressure stabilizing means for indicating activation of said pressure stabilizing means.

10. An overspeed protection system as in claim 9 wherein said indicator means provides a visual indication.

11. An overspeed protection system as in claim 1 further comprising time delay means in communication with said pressure sensing means for overriding the pressure sensing means after a selected period of time.

12. An overspeed protection system for a turboprop engine, said engine comprising a turbine, an array of propeller blades rotatably driven by said turbine, a fluid actuated pitch adjustment means for adjusting the pitch of the propeller blades and a source of fluid in communication with said pitch adjustment means, said overspeed protection system comprising:
  a governor pump in communication with the source of fluid and being operatively driven by the turbine to produce a constant pressure flow of fluid from said source of fluid;
  a constant speed governor in communication with said governor pump and said pitch adjustment means and being operatively driven by said turbine to vary the pressure of fluid directed thereto by said governor pump, said variations in pressure produced by said constant speed governor being proportional to the speed of the turbine;
  a source of electrical power;
  a pressure sensitive switch operatively connected to said source of electrical power and being disposed intermediate said governor pump and said constant speed governor, said pressure sensitive switch being operative to sense a decrease in pressure of fluid produced by said governor pump;
  a lock pitch solenoid operatively connected to said source of electrical power and to said pressure sensitive switch, said lock pitch solenoid being disposed intermediate said constant speed governor and said pitch adjustment means and being operative to interrupt the fluid communication between said constant speed governor and said pitch adjustment means in response to a decrease in fluid pressure sensed by said pressure sensitive switch.

13. An overspeed protection system as in claim 12 further comprising test switch means in communication with said source of electrical power and said lock pitch solenoid for testing the operability of said lock pitch pressure solenoid.

14. An overspeed protection system as in claim 12 further comprising indicator means in communication with said lock pitch solenoid and said source of electrical power for providing an indication upon activation of said lock pitch solenoid.

15. An overspeed protection system as in claim 14 wherein said indicator means is further in communication with said pressure sensitive switch and is operative to provide an indication upon a sensed decrease in the pressure of fluid produced by said governor pump.

* * * * *

UNITED STATES PATENT AND TRADEMARK OFFICE
CERTIFICATE OF CORRECTION

PATENT NO. : 4,711,615
DATED : 12/8/87
INVENTOR(S) : Radu Rusu

It is certified that error appears in the above-identified patent and that said Letters Patent are hereby corrected as shown below:

Title page:

The name of the assignee should read:

--Textron/Avco Corp.--.

Signed and Sealed this

Third Day of May, 1988

Attest:

DONALD J. QUIGG

Attesting Officer

Commissioner of Patents and Trademarks